My invention relates to electric fuel gauge systems for indicating volume of liquid fuel contained in a tank of the system and more particularly to an improved low-level warning system incorporated with the fuel gauge system of this type.

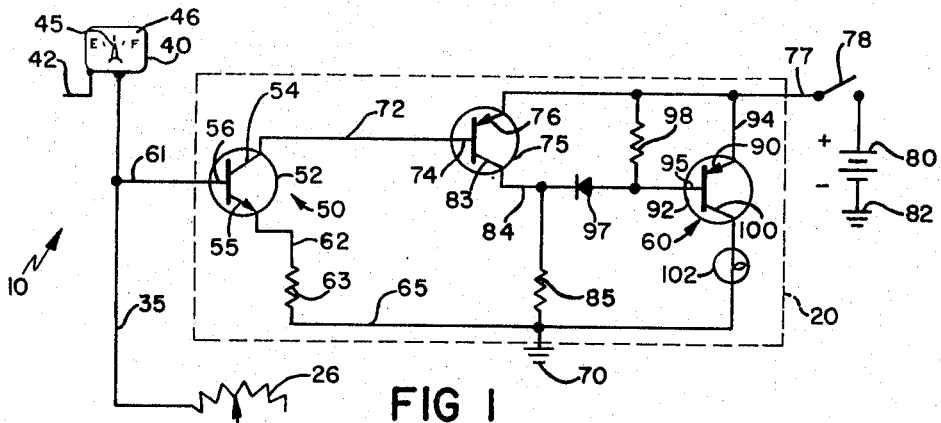
Aug. 1, 1967     F. E. McCAULEY, JR     3,334,339
FUEL GAS GAUGE WITH LOW-LEVEL WARNING INDICATOR
Filed April 16, 1965
INVENTOR.
FRANK E. McCAULEY, JR.
BY Schroeder, Siegfried & Ryan
ATTORNEYS 3,334,339
FUEL GAS GAUGE WITH LOW-LEVEL WARNING INDICATOR
Frank E. McCauley, Jr., 619 Robinwood Lane, Hopkins, Minn. 55343
Filed Apr. 16, 1965, Ser. No. 448,815
10 Claims. (Cl. 340—181)

Electric fuel gauge systems and liquid level indicating systems in general have previously incorporated various apparatus to provide a warning under conditions of low-level of liquid within the system. In fuel gauge systems for automotive type vehicles, such low-level warning apparatus or devices have failed to find wide acceptance because of complexity, cost, and the inaccuracy introduced by such a system or device to the fuel gauge. Specifically, apparatus of this type has been applied to the indicator portion of the fuel gauge system in terms of special relay and meter mechanisms which have been costly, generally inaccurate and have provided increased maintenance problems. Where attempts have been made to connect directly into the circuit of the electric fuel gauge system, the impedance of the connecting circuit has been such as to alter the accuracy and calibration of the fuel gauge system making such an additional warning element undesirable from a cost and performance standpoint. Further, the use of a switching type relay in such a fuel gauge system alters the accuracy and characteristics of the system in addition to introducing maintenance problems such as to limit the application of such low-level warning devices.

The present invention is directed to an improved low-level warning device for use with electric fuel gauge systems in which the system includes an impedance matching element such that it may be directly connected into the fuel gauge system without altering the impedance of the same and making such a system applicable to all electric fuel gauge systems without altering the operation and calibration of the indicator gauge. The improved low-level warning system includes a solid state switching unit operating into an indicating light for low-level warning which eliminates maintenance problems through the elimination of moving parts and current drain on the electrical system of the vehicle with which it is to be associated. Further, the improved low-level warning system is transistorized and low in cost making it readily available and installable in original equipment vehicles and as an add on unit or accessory in existing fuel gauge systems. This improved low-level warning device is packaged such as to be mounted on a metallic surface of the vehicle within vision of the operator with the mounting completing the electrical circuit and providing for only a dual circuit connection to the energizing source and fuel gauge system for a simplified installation. It may also be mounted on the back of a conventional fuel gauge indicator and operate in conjunction therewith without altering the characteristics or physical structure of the indicator.

Therefore it is an object of this invention to provide an improved low-level warning system for electric fuel gauge systems.

Another object of this invention is to provide in a low-level warning system, an impedance matching circuit which permits connection with the electric fuel gauge system without altering the electrical characteristics of the same or disturbing the calibration of the indicator of such a system.

A further object of this invention is to provide a transistorized low-level warning system of the liquid level type.

It is further an object of this invention to provide a low-level warning system which is simplified in design, low in cost, is accurate in operation and has an exceeding long life.

These and other objects of this invention will become apparent from a reading of the attached description together with the drawings wherein:

FIGURE 1 is a schematic circuit diagram of the improved low-level warning system connected to an electric fuel gauge system.

FIGURE 2 is a schematic electric diagram of an alternate embodiment of the low-level warning system.

FIGURE 3 is a schematic diagram showing the installation of such a low-level warning system.

FIGURE 4 is a side elevation view of a fuel gauge indicator for an electric fuel gauge system showing a mounting of a device incorporating the low-level warning system, and FIGURE 5 is a sectional view of the improved low-level warning device of FIGURE 4 taken along the lines 5—5 therein.

My improved low-level warning system is shown schematically in FIGURE 1 in connection with a fuel gauge system of the electric type. Thus, as will be seen in FIGURE 1, a fuel gauge system is shown generally at 10 and a low-level warning system at 20. The fuel gauge system includes a tank unit comprised of a float 22 positioned in a tank 23 adapted to contain a liquid. The float is pivotally mounted and connected through a linkage 24 to the wiper 25 of a variable impedance element or resistor 26. The variable impedance element is grounded from the wiper through a conductor indicated at 30 and a ground connection 32 with the resistance element being connected by a conductor 35 to a meter type indicator 40 having an energizing conductor 42 connected thereto. Meter 40 is shown only schematically inasmuch as it may take varying forms. It normally is of the electromagnetic type in which the energization of the rotating or movable element of the meter is controlled and proportionally positioned with changes in the circuit impedance as adjusted by the resistor 26, wiper 25 combination of the tank unit. The meter includes a needle 45 connected to the rotating element of the meter which cooperates with an indicia 46 on the face of a meter to indicate position of the float within the tank and hence quantity of fuel within the tank in a conventional manner.

The calibration of such electric fuel systems is critical and varies from vehicle to vehicle depending upon tank shape and the electrical components of the system. These systems are of the low impedance type such that attempts to connect circuits or components thereto will normally reflect a change in impedance of the circuit and hence change in the indication of the guage. This is particularly true when electrical units, such as relays with attendant higher current drain, are connected thereto. Normally the system is energized in connection with the ignition control circuit of a vehicle with the energizing conductor, such as 42, being connected to a battery supply through an appropriate control switch associated with the ignition system of the vehicle.

The low-level warning system of the present invention is disclosed herein as a transistorized swtching unit incorporating an impedance matching section 50 and a switching section 60. The impedance matching section 50 utilizes an NPN type transistor 52 having a collector electrode 54, an emitter electrode 55 and a base electrode 56. The transistor 52 is connected in a conventional grounded emitter configuration to provide an impedance matching type circuit which is connected to the electric fuel gauge system such that it matches the low-level impedance thereof and presents a minimum of current drain therethrough so as not to effect the impedance balance of the calibrated fuel gauge circuit or to disturb the readings therefrom. Thus as will be seen in FIGURE 1, the base electrode 56 is connected by a conductor 61 to the conductor 35 which connects the variable impedance section of the tank unit to the meter type indicator 40 of the fuel gauge system. Such a connection can be made at the meter, or at the tank unit, or at any point in between the same without affecting the balance of the system. In the grounded emitter configuration of the impedance matching unit, the emitter is connected through a conductor 62 and a voltage level adjusting resistor 63 to a ground conductor 65 leading to a ground 70 of the system. The collector electrode 54 is directly connected through a conductor 72 to the base 74 of a second transistor 75 whose emitter electrode 76 is connected through a conductor 77 to a remotely positioned switch, indicated at 78, and leading to a battery supply 80 which is grounded as at 82. Switch 78 could be the ignition circuit or switch for the vehicle with which the fuel gauge system is associated and the battery supply 80, the battery for the vehicle. The transistor 75 is of the PNP type with its collector 83 being connected through a conductor 84 and a voltage level adjusting resistor 85 to the ground conductor 65. Transistor 75 is normally biased in the "on" condition for all conditions of output except an indication of a predetermined low-level of fuel in the tank circuit as transmitted by the impedance matching unit. The switching circuit also includes a third transistor indicated at 92, this transistor being of the PNP type with its emitter 90 being connected through a conductor 94 to the energizing conductor 77 for the low-level warning system. The base conductor 95 of transistor 92 is connected through a rectifier 97 to the collector 83 of the transistor 75 common to the voltage level resistance 85 and ground conductor 65. A biasing resistor 98 is connected between the base electrode 95 and the energizing conductor 77 of the system to adjust the voltage bias on the base of the transistor 92. Its collector 100 is connected through an indicating light 102 to the ground conductor 65 to complete the energizing circuit. The transistor 92 is normally biased in the "off" condition inasmuch as the transistor 75 in its normally "on" condition operates as a shunt for the biasing resistor 98 through the rectifier 97 to adjust the bias level on the transistor 92 for "off" condition of operation. Whenever the transistor 75 is turned "off," current flow will be directed from the energizing conductor 77 through the bias resistor 98 and rectifier 97 to voltage level adjusting resistor 85 to establish a predetermined bias on the base 95 of the swtiching transistor 90 which will cause it to conduct and the light 102 to glow.

With this type of circuit, a minimum of current is drawn from the energizing circuit through the conductor 77 from the battery source for a stand by operation. Under these conditions of operation, only transistor 75 is conducting and it operates as a switch to energize the switching transistor 92 to control the energization of the light 102 under predetermined conditions. Thus, for normal tank conditions, the impedance level of the fuel gauge circuit is such that the impedance matching or grounded configuration of the transistor 52 will reflect a bias level on the base of the transistor 75 to hold it in the "on" condition. Whenever the fuel gauge system is indicating a predetermined low-level of fuel in the tank 23, the impedance in this network will adjust the level of the impedance in the impedance matching circuit so that the matching transistor will reflect the same through a change in the bias at the base electrode 56 of the transistor 52. This will operate to turn the transistor 92 to energize the indicating light.

An alternate circuit embodiment for the low-level warning system is shown in FIGURE 2 with the details of the fuel gauge system omitted for simplicity. Thus the low-level warning system in FIGURE 2 shows the impedance matching unit 50 or its transistor 52 having the base electrode 56 connected through the conductors 61 to the fuel gauge system, which is not shown. The collector electrode 54 is connected to the base electrode 95 of the switching transistor 92 and the emitter 55 of the transistor 52 is connected through the voltage level or divider resistor 63 to the ground conductor 65 and ground 70. In this embodiment, the PNP type switching transistor 92 is maintained in an "on" condition under normal operation of the fuel gauge system and is turned "off" whenever the impedance in the fuel gauge system is adjusted to indicate the low fuel level. Thus the collector 100 of the transistor 92 is connected through a voltage level adjusting resistor 105 to the ground conductors 65, and the emitter 90 is connected through the conductor 94 to the energizing conductor 77 leading to the remotely positioned control switch 78 and battery supply 80 which is grounded as at 82. The indicating light 102 is connected in parallel circuit with the emitter collector electrodes of the transistor 92 such that when the transistor is in an "on" condition, the light will be shorted and hence not glow. Whenever the transistor 90 is in an "off" condition of operation, its impedance level is adjusted so that current flow will be directed from the energizing conductor 77 through the indicating light and the voltage level adjusting resistor 105 to energize the same to a glow condition. This embodiment simplifies the circuitry in that it eliminates the control transistor for the switch unit but does present the problem of a slightly higher current drain on the battery system.

The FIGURES 4, 5 and 6 show typical mountings and construction of a low-level warning system. The circuit configurations shown in FIGURES 1 and 2 are normally embodied in a printed circuit 110 mounted on a suitable base member 120 with the individual transistors 52, 75, and 92 together with the resistors 63, 85, 98 and diode 92 being physically attached to the board and connected to the printed circuit conductors. Thus the broken away portion of the system shown in elevation in FIGURE 4 shows such a physical arrangement of parts. The indicating light 102 is also attached to the board and projects therefrom. The energizing conductor 77 and the input conductor 61 of the circuit extend from the board for appropriate connection to the fuel gauge and its energizing for battery circuit.

In FIGURES 3 and 4, the printed circuit mounted on the base member 120 and mounting the elements of the control circuit are positioned within a housing 124 with the indicating light 102 extending through an aperture in the same. FIGURE 3 shows one modification or adaptation of mounting of the low-level warning system as an accessory unit on the vehicle. Thus as is shown in FIGURE 3, the housing 125 is attached to the dashboard of a vehicle indicated at 130 on a metallic surface of the same with the indicating light being exposed to the view of the operator of the vehicle. The physical mounting of the metallic casing 125 operates to ground the low-level warning system to the vehicle, it being understood that the ground conductor 65 is connected to the housing through a mounting of the base member 120 on the housing. Thus the structural mounting of the housing completes the energizing circuit for the low-level warning system and only the conductors 77 and 61 extend from the housing to be connected to the ignition circuit, if desired, and the fuel gauge circuit at the indicator or at the tank unit, whichever is desired.

The mounting of the warning indicator in FIGURE 4 shows in section a surface of the dashboard 140 having a glass surface 142 therein through which the instruments are viewed by the operator. Physically mounted on the dashboard through brackets 144 is the indicating meter of the fuel gauge system. With the mounting shown in FIGURE 4, the housing 125 for the low-level warning system is physically attached to the surface of the meter such as by a mounting screw 147 which performs the grounding of the low-level system to the casing of the indicating meter. In this embodiment, the aperture in the housing 125 of a low-level warning system coincides with a similar aperture 150 which may be made in back of the fuel gauge indicating meter such that the indicating light may be projected thereto and be viewed on the face of the meter as an indication of a predetermined fuel condition. This type of installation may be an accessory which is added on in a factory in the manufacture of a vehicle or may be inserted by an automobile dealer or repairman on any existing vehicle.

In considering this invention it should be remembered that the present disclosure is intended to be illustrative only and the scope of the invention should be determined only by the appended claims.

What is claimed is:

1. A low-level warning indicator adapted to be connected to an electrical fuel gauge system having a float operated variable impedance tank unit and a remotely positioned electrically operated meter type indicator connected thereto and controllably energized therefrom comprising, a control circuit including an impedance matching element and a switching element, said elements being directly coupled together with a single input conductor connected to the impedance matching element and adapted to be connected between the float operated variable impedance and the meter type indicator so as not to alter the impedance to the fuel gauge system, a single energizing conductor connected to the switching element and adapted to be connected to an electrical source to energize both the impedance matching element and the switching element, an indicator light connected in an energizing circuit controlled by the switching element, and a common return connection for the elements of the control circuit and the indicator light to complete the energizing circuit for said elements and the indicator light.

2. The low-level warning indicator of claim 1 in which the impedance matching element and the switching element are transistor units with the impedance matching element being connected in a grounded emitter circuit configuration and directly coupled to the switching element.

3. The low-level warning indicator of claim 2 in which the switching element is at least one transistor having base, emitter and collector of the transistor forming the impedance matching element and the remaining electrodes being connected between the energizing circuit conductor and the indicator light.

4. The low-level warning indicator of claim 3 in which the indicator light is connected in a series circuit with the switching element to be controllably energized thereby.

5. The low-level warning indicator of claim 3 in which the indicator light is connected in a parallel circuit with the switching element to be controllably energized thereby.

6. The low-level warning indicator of claim 3 in which the control circuit is formed in part by a printed circuit mounted on a base member and providing the connections between the transistors and the indicator light with the transistors and the indicator light being mounted on the base member which in turn is adapted to be mounted on a metallic surface of an automotive type vehicle incorporating an electric fuel gauge system to provide the common return connection of the energizing circuit for the elements and the indicator light.

7. The low-level warning indicator of claim 6 in which the base member includes an enclosing housing through which the indicator light extends and including mounting means extending through the housing and into contact with the printed circuit of the base member to provide the common return connection for the energizing circuit of the elements and the indicator light and the mechanical connection through which the low-level warning indicator is adapted to be mounted on a metallic surface of an automotive type vehicle.

8. A low-level warning indicator adapted to be connected to an electrical fuel gauge system having a float operated variable impedance tank unit and a remotely positioned electrically operated meter type indicator connected thereto and controllably energized therefrom comprising: a control circuit including first and second transistor elements each of which has a base electrode, an emitter electrode, and a collector electrode, circuit means connected to the base electrode of the first transistor and adapted to be connected to the connection between the float operated variable impedance tank unit and the electrically operated meter type indicator; additional circuit means connecting the emitter electrode through a voltage level determining resistor to a common connection, further circuit means connecting the emitter of the second transistor to an energizing conductor adapted to be connected to a source of power and the base of the second transistor to the collector of the first transistor; an indicator light adapted to be controllably energized from the energizing conductor through the operation of the second transistor, said indicator light being connected to the collector of the second transistor to be controlled thereby; and means including conductor means connecting the indicator light and the common conductor to a ground connection to complete the energizing circuit for the first and second transistor.

9. The low-level warning indicator of claim 8 in which the further connection of the second transistor includes an additional transistor connected between the base electrode of the second transistor and the collector electrode of the first transistor which additional transistor is biased to a condition of operation opposite that of the second transistor such that the second transistor will be conducting to energize the indicator bulb when the additional transistor is turned off.

10. The low-level warning indicator of claim 8 in which the connection of the indicator bulb to the collector of the second transistor includes a connection to the emitter of said second transistor to provide a parallel energization circuit for the indicator bulb which will be operative to cause the indicator bulb to glow whenever the second transistor is turned off.

References Cited
UNITED STATES PATENTS

| | | | |
|---|---|---|---|
| 2,736,883 | 2/1956 | Boddy | 340—181 |
| 2,756,410 | 7/1956 | Tobias | 340—181 |

NEIL C. READ, *Primary Examiner.*

THOMAS B. HABECKER, *Examiner.*